United States Patent
Farooq et al.

(10) Patent No.: US 11,269,888 B1
(45) Date of Patent: Mar. 8, 2022

(54) ARCHIVAL DATA STORAGE FOR STRUCTURED DATA

(71) Applicant: Amazon Technologies, Inc., Seattle, WA (US)

(72) Inventors: Umar Farooq, Mercer Island, WA (US); Rishabh Animesh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 970 days.

(21) Appl. No.: 15/362,591

(22) Filed: Nov. 28, 2016

(51) Int. Cl.
 G06F 21/60 (2013.01)
 G06F 16/11 (2019.01)
 G06F 16/16 (2019.01)
 G06F 16/2455 (2019.01)
 G06F 16/22 (2019.01)
 G06F 16/25 (2019.01)

(52) U.S. Cl.
 CPC ...... *G06F 16/24561* (2019.01); *G06F 16/113* (2019.01); *G06F 16/164* (2019.01); *G06F 16/22* (2019.01); *G06F 16/258* (2019.01); *G06F 21/602* (2013.01)

(58) Field of Classification Search
 None
 See application file for complete search history.

(56) References Cited

U.S. PATENT DOCUMENTS

| | | |
|---|---|---|
| 5,488,701 A | 1/1996 | Brady et al. |
| 5,729,671 A | 3/1998 | Peterson et al. |
| 6,249,836 B1 | 6/2001 | Downs et al. |
| 6,665,565 B1 | 12/2003 | Stomberg et al. |
| 6,779,150 B1 | 8/2004 | Walton et al. |
| 6,862,362 B2 | 3/2005 | Gangadhar |
| 6,922,700 B1 | 7/2005 | Aggarwal et al. |
| 7,117,294 B1 | 10/2006 | Mi et al. |
| 7,142,150 B2 | 11/2006 | Thackray |
| 7,380,129 B2 | 5/2008 | Keohane et al. |
| 7,418,478 B1 | 8/2008 | Orling et al. |
| 7,490,013 B2 | 2/2009 | Wells |

(Continued)

FOREIGN PATENT DOCUMENTS

| | | |
|---|---|---|
| JP | 2004531923 A | 10/2004 |
| JP | 5858506 B1 | 2/2016 |

(Continued)

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

(Continued)

*Primary Examiner* — Mark D Featherstone
*Assistant Examiner* — Navneet Gmahl
(74) *Attorney, Agent, or Firm* — Davis Wright Tremaine LLP

(57) ABSTRACT

A data storage system implements techniques to efficiently store and retrieve structured data. For example, structured data is transformed into correlated segments, which are then redundancy coded and archived in a correlated fashion. The characteristics of the redundancy code used enable flexible handling of the archived data without excessive latency.

20 Claims, 11 Drawing Sheets

(56) References Cited

U.S. PATENT DOCUMENTS

| | | | |
|---|---|---|---|
| 7,693,813 B1 | 4/2010 | Cao et al. | |
| 7,783,600 B1 | 8/2010 | Spertus et al. | |
| 7,805,706 B1 | 9/2010 | Ly et al. | |
| 7,930,611 B2 | 4/2011 | Huang et al. | |
| 8,261,033 B1 | 9/2012 | Slik et al. | |
| 8,386,841 B1 | 2/2013 | Renade | |
| 8,391,226 B2 | 3/2013 | Rune | |
| 8,413,187 B1 | 4/2013 | Del Sesto et al. | |
| 8,479,078 B2 | 7/2013 | Resch et al. | |
| 8,504,518 B1 | 8/2013 | Ghemawat et al. | |
| 8,504,535 B1 | 8/2013 | He et al. | |
| 8,612,219 B2 | 12/2013 | Tsuchinaga et al. | |
| 8,621,069 B1 | 12/2013 | Tompkins | |
| 8,706,980 B2 | 4/2014 | Dhuse et al. | |
| 8,769,049 B2 | 7/2014 | Murphy et al. | |
| 8,788,855 B2 | 7/2014 | Cong et al. | |
| 8,806,296 B1 | 8/2014 | Lazier | |
| 8,850,288 B1 | 9/2014 | Lazier et al. | |
| 8,868,825 B1 | 10/2014 | Hayes et al. | |
| 8,869,001 B1 | 10/2014 | Lazier | |
| 8,935,221 B1 | 1/2015 | Lazier et al. | |
| 8,935,761 B2 | 1/2015 | Gladwin et al. | |
| 8,938,591 B2 | 1/2015 | Mark et al. | |
| 8,959,067 B1 | 2/2015 | Patiejunas et al. | |
| 8,984,363 B1 | 3/2015 | Juels et al. | |
| 8,984,384 B1 | 3/2015 | Juels et al. | |
| 9,002,805 B1 | 4/2015 | Barber et al. | |
| 9,003,144 B1 | 4/2015 | Hayes et al. | |
| 9,009,491 B2 | 4/2015 | Resch | |
| 9,021,297 B1 | 4/2015 | Hayes et al. | |
| 9,047,214 B1 | 6/2015 | Northcott | |
| 9,052,942 B1 | 6/2015 | Barber et al. | |
| 9,092,441 B1 | 7/2015 | Patiejunas et al. | |
| 9,110,797 B1 | 8/2015 | Lazier | |
| 9,152,514 B2 * | 10/2015 | Resch | G06F 21/64 |
| 9,165,002 B1 | 10/2015 | Lazier | |
| 9,208,018 B1 | 12/2015 | Northcott et al. | |
| 9,213,485 B1 | 12/2015 | Hayes et al. | |
| 9,213,709 B2 | 12/2015 | Patiejunas et al. | |
| 9,218,244 B1 | 12/2015 | Hayes et al. | |
| 9,223,789 B1 | 12/2015 | Seigle et al. | |
| 9,225,675 B2 | 12/2015 | Patiejunas et al. | |
| 9,244,761 B2 | 1/2016 | Yekhanin et al. | |
| 9,250,811 B1 | 2/2016 | Patiejunas | |
| 9,251,097 B1 | 2/2016 | Kumar et al. | |
| 9,256,467 B1 | 2/2016 | Singh et al. | |
| 9,256,761 B1 | 2/2016 | Sahu et al. | |
| 9,270,683 B2 | 2/2016 | Coughlin et al. | |
| 9,271,052 B2 | 2/2016 | Holden | |
| 9,281,845 B1 | 3/2016 | Lazier | |
| 9,298,760 B1 | 3/2016 | Li et al. | |
| 9,313,172 B1 | 4/2016 | Brandwine | |
| 9,354,683 B2 | 5/2016 | Patiejunas et al. | |
| 9,378,084 B2 | 6/2016 | Calder et al. | |
| 9,405,333 B1 | 8/2016 | Pine | |
| 9,448,614 B2 | 9/2016 | Slik | |
| 9,449,346 B1 | 9/2016 | Hockey et al. | |
| 9,459,959 B1 | 10/2016 | Franklin et al. | |
| 9,461,876 B2 | 10/2016 | Van Dusen et al. | |
| 9,489,832 B2 | 11/2016 | Nair et al. | |
| 9,495,249 B1 | 11/2016 | Franklin et al. | |
| 9,495,255 B2 | 11/2016 | Davis et al. | |
| 9,501,349 B2 * | 11/2016 | Resch | G06F 11/10 |
| 9,513,820 B1 | 12/2016 | Shalev | |
| 9,563,681 B1 | 2/2017 | Patiejunas et al. | |
| 9,672,110 B1 | 6/2017 | Patel | |
| 9,753,669 B2 | 9/2017 | Ben-Shaul et al. | |
| 9,785,495 B1 | 10/2017 | Lazier et al. | |
| 9,792,179 B1 | 10/2017 | Lazier | |
| 9,825,625 B2 | 11/2017 | Thalheim | |
| 9,825,652 B1 | 11/2017 | Lazier | |
| 9,838,041 B1 * | 12/2017 | Lazier | G06F 16/113 |
| 9,838,042 B1 | 12/2017 | Lazier | |
| 9,853,662 B1 | 12/2017 | Lazier et al. | |
| 9,866,242 B1 | 1/2018 | Lazier | |
| 9,904,589 B1 | 2/2018 | Donlan et al. | |
| 9,923,966 B1 | 3/2018 | Franklin et al. | |
| 9,934,389 B2 | 4/2018 | Paterra et al. | |
| 9,998,150 B1 * | 6/2018 | Lazier | H04L 67/1095 |
| 9,998,539 B1 | 6/2018 | Brock et al. | |
| 10,009,044 B1 * | 6/2018 | Lazier | G06F 11/1008 |
| 10,061,668 B1 | 8/2018 | Lazier et al. | |
| 10,083,030 B1 | 9/2018 | Fant, IV et al. | |
| 10,097,356 B2 | 10/2018 | Zinder | |
| 10,394,789 B1 * | 8/2019 | Animesh | G06F 16/278 |
| 10,645,582 B2 | 5/2020 | Wohlert et al. | |
| 2003/0032417 A1 | 2/2003 | Minear et al. | |
| 2003/0172325 A1 | 9/2003 | Wyatt et al. | |
| 2004/0040025 A1 | 2/2004 | Lehtinen | |
| 2004/0054997 A1 | 3/2004 | Katragadda et al. | |
| 2004/0128470 A1 | 7/2004 | Hetzler et al. | |
| 2004/0230764 A1 | 11/2004 | Merchant et al. | |
| 2004/0268037 A1 | 12/2004 | Buchanan et al. | |
| 2006/0004675 A1 | 1/2006 | Bennett et al. | |
| 2006/0064709 A1 | 3/2006 | Throckmorton et al. | |
| 2006/0074954 A1 | 4/2006 | Hartline et al. | |
| 2006/0080574 A1 | 4/2006 | Saito et al. | |
| 2006/0117217 A1 | 6/2006 | Chien et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0124020 A1 | 5/2007 | Staples | |
| 2007/0156842 A1 | 7/2007 | Vermeulen et al. | |
| 2007/0180294 A1 | 8/2007 | Kameyama et al. | |
| 2007/0245331 A1 | 10/2007 | Daynes et al. | |
| 2008/0033914 A1 | 2/2008 | Cherniack et al. | |
| 2008/0189705 A1 | 8/2008 | Weinert et al. | |
| 2009/0094250 A1 | 4/2009 | Dhuse et al. | |
| 2009/0222596 A1 * | 9/2009 | Flynn | G06F 3/061 710/22 |
| 2009/0319078 A1 | 12/2009 | Jackson | |
| 2010/0023561 A1 * | 1/2010 | Zlotnick | G06F 11/1469 707/E17.008 |
| 2010/0036851 A1 * | 2/2010 | Paterson-Jones | G06F 3/0619 707/636 |
| 2010/0036931 A1 * | 2/2010 | Certain | G06F 11/1451 709/214 |
| 2010/0037031 A1 * | 2/2010 | DeSantis | G06F 11/1461 711/162 |
| 2010/0131792 A1 | 5/2010 | Herrod | |
| 2010/0138764 A1 | 6/2010 | Hatambeiki et al. | |
| 2010/0153941 A1 | 6/2010 | Borissov et al. | |
| 2010/0306267 A1 | 12/2010 | Zamkoff et al. | |
| 2010/0318999 A1 | 12/2010 | Zhao et al. | |
| 2010/0328528 A1 | 12/2010 | Eggert | |
| 2010/0332751 A1 | 12/2010 | Quigley et al. | |
| 2011/0022633 A1 | 1/2011 | Bernosky et al. | |
| 2011/0055661 A1 | 3/2011 | Grube et al. | |
| 2011/0078277 A1 | 3/2011 | Baptist | |
| 2011/0122523 A1 * | 5/2011 | Gladwin | G11B 20/1252 360/49 |
| 2011/0126295 A1 * | 5/2011 | Resch | G06F 21/64 726/27 |
| 2011/0202929 A1 | 8/2011 | Schleimer et al. | |
| 2011/0218966 A1 * | 9/2011 | Barnes | G06F 11/1451 707/645 |
| 2011/0225209 A1 | 9/2011 | Volvovski et al. | |
| 2011/0225426 A1 | 9/2011 | Agarwal et al. | |
| 2011/0264717 A1 | 10/2011 | Grube et al. | |
| 2011/0289263 A1 | 11/2011 | McWilliams et al. | |
| 2011/0296195 A1 | 12/2011 | Nakagawa et al. | |
| 2011/0296440 A1 | 12/2011 | Laurich et al. | |
| 2012/0011398 A1 * | 1/2012 | Eckhardt | G06F 11/2028 714/15 |
| 2012/0016901 A1 * | 1/2012 | Agarwal | G06F 16/258 707/769 |
| 2012/0017096 A1 | 1/2012 | Snider | |
| 2012/0079189 A1 | 3/2012 | Colgrove et al. | |
| 2012/0079190 A1 | 3/2012 | Colgrove et al. | |
| 2012/0110150 A1 | 5/2012 | Kosuru et al. | |
| 2012/0163596 A1 * | 6/2012 | Grube | G06F 21/62 380/252 |

(56) References Cited

U.S. PATENT DOCUMENTS

| | | |
|---|---|---|
| 2012/0185437 A1 | 7/2012 | Pavlov et al. |
| 2012/0226933 A1 | 9/2012 | Baptist et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0290539 A1 | 11/2012 | Bryant et al. |
| 2012/0297311 A1 | 11/2012 | Duggal |
| 2012/0310878 A1 | 12/2012 | Vuksan et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0124466 A1* | 5/2013 | Naidu ............... G06F 8/453 707/610 |
| 2013/0151653 A1 | 6/2013 | Sawicki et al. |
| 2013/0191527 A1* | 7/2013 | Ashok ............... G06F 9/5072 709/224 |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2013/0339818 A1* | 12/2013 | Baker ............... G06F 11/10 714/763 |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1* | 2/2014 | Patiejunas ............ G06F 16/2308 707/687 |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0310792 A1 | 10/2014 | Hyland et al. |
| 2014/0325266 A1* | 10/2014 | Hoffman ............ G06F 11/2094 714/6.32 |
| 2014/0331100 A1* | 11/2014 | Dhuse ............... G06F 21/64 714/752 |
| 2014/0337684 A1* | 11/2014 | Resch ............... G06F 11/10 714/763 |
| 2014/0344446 A1 | 11/2014 | Rjeili et al. |
| 2014/0351632 A1* | 11/2014 | Grube ............... G06F 11/1076 714/6.24 |
| 2014/0351917 A1 | 11/2014 | Chickering |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0149870 A1 | 5/2015 | Kozat |
| 2015/0154111 A1 | 6/2015 | D'Abreu et al. |
| 2015/0160879 A1* | 6/2015 | Flynn ............... G06F 3/061 711/103 |
| 2015/0161184 A1* | 6/2015 | Patiejunas ............ G06F 16/2228 707/673 |
| 2015/0169253 A1* | 6/2015 | Donlan ............. G06F 3/0604 711/161 |
| 2015/0169716 A1 | 6/2015 | Franklin et al. |
| 2015/0175333 A1 | 6/2015 | Richardson et al. |
| 2015/0256423 A1 | 9/2015 | Stearns |
| 2015/0278324 A1 | 10/2015 | Wong et al. |
| 2015/0317340 A1* | 11/2015 | Sardina ............. G06F 16/22 707/803 |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0350362 A1 | 12/2015 | Pollack et al. |
| 2015/0355974 A1 | 12/2015 | Hayes et al. |
| 2015/0355979 A1* | 12/2015 | Volvovski ............ G06F 16/21 707/675 |
| 2015/0356005 A1 | 12/2015 | Hayes et al. |
| 2016/0011816 A1 | 1/2016 | Aizman |
| 2016/0034295 A1 | 2/2016 | Cochran |
| 2016/0034530 A1* | 2/2016 | Nguyen ............. G06F 16/2471 707/719 |
| 2016/0034547 A1* | 2/2016 | Lerios ............... G06F 16/254 707/602 |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0041906 A1* | 2/2016 | Mukherjee ......... G06F 16/2379 711/119 |
| 2016/0048399 A1 | 2/2016 | Shaw |
| 2016/0048698 A1* | 2/2016 | Sahu ............... G06F 16/90335 707/783 |
| 2016/0062623 A1 | 3/2016 | Howard et al. |
| 2016/0062833 A1* | 3/2016 | Slik ............... G06F 16/22 714/764 |
| 2016/0085797 A1 | 3/2016 | Patiejunas et al. |
| 2016/0092248 A1 | 3/2016 | Shani et al. |
| 2016/0154963 A1* | 6/2016 | Kumar ............... H04L 9/0822 713/189 |
| 2016/0179824 A1 | 6/2016 | Donlan et al. |
| 2016/0203477 A1 | 7/2016 | Yang et al. |
| 2016/0216991 A1 | 7/2016 | Ansari et al. |
| 2016/0241577 A1* | 8/2016 | Johnson ............. G06F 16/278 |
| 2016/0283941 A1 | 9/2016 | Andrade |
| 2016/0335310 A1 | 11/2016 | Lahiri et al. |
| 2017/0024281 A1 | 1/2017 | Franklin et al. |
| 2017/0060687 A1* | 3/2017 | Franklin ............. G06F 11/167 |
| 2017/0097875 A1* | 4/2017 | Jess ............... G06F 11/2069 |
| 2017/0123728 A1* | 5/2017 | Rungta ............. G06F 3/0611 |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0082256 A1 | 3/2018 | Tummuru et al. |
| 2018/0089037 A1* | 3/2018 | Liu ............... G06F 11/1469 |
| 2018/0089269 A1* | 3/2018 | Pal ............... G06F 16/24554 |
| 2019/0163821 A1* | 5/2019 | Pal ............... G06F 16/904 |
| 2019/0208014 A1* | 7/2019 | Goldberg ............ G06F 16/156 |

FOREIGN PATENT DOCUMENTS

| | | |
|---|---|---|
| JP | 2016081134 A | 5/2016 |
| KR | 20130107383 A | 10/2013 |
| WO | 02071382 A1 | 9/2002 |
| WO | 2014047073 A1 | 3/2014 |
| WO | 2016067295 A1 | 5/2016 |

OTHER PUBLICATIONS

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

(56) References Cited

OTHER PUBLICATIONS

International Search Report and Written Opinion dated Aug. 25, 2016, International Patent Application No. PCT/US2016/040510, filed Jun. 30, 2016.
Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.
Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.
"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.
Australian Examination Report No. 1 dated Feb. 3, 2020, Patent Application No. 2017336924, filed Sep. 29, 2017, 4 pages.
Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.
European Office Action dated Nov. 6, 2018, Patent Application No. 16739357.8-1222, published May 9, 2018, 7 pages.
Franco, "Understanding Bitcoin: Cryptography, Engineering and Economics," Wiley, Nov. 24, 2014, 167 pages.
He et al., "Elastic Application Container: A Lightweight Approach for Cloud Resource Provisioning," 26th IEEE International Conference on Advanced Information Networking and Applications, Mar. 26, 2012, pp. 15-22.
IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), May 15, 2009, 204 pages.
International Organization for Standardization/International Electrotechnical Commission, "Information technology—Trusted Platform Module—Part 4: Commands," International Standard, ISO/IEC 11889-4:2009(E), May 15, 2009, 254 pages.
International Search Report and Written Opinion in International Patent Application No. PCT/US2015/050513, dated Feb. 16, 2016, 22 pages.
International Search Report and Written Opinion dated Feb. 4, 2016, International Patent Application No. PCT/US2015/059983, 12 pages.
International Search Report and Written Opinion dated Nov. 22, 2017, International Patent Application No. PCT/US2017/054319, filed Sep. 29, 2017, 14 pages.
Japanese Notice of Reasons for Rejection dated Feb. 18, 2020, Patent Application No. 2019-516608, filed Sep. 29, 2017, 3 pages.
Japanese Office Action dated Mar. 5, 2019, Patent Application No. 2017-566702, filed Mar. 22, 2017, 8 pages.
Kim, "How Sharding Works," Medium, Dec. 5, 2014 [retrieved Nov. 17, 2017], https://medium.com/@jeeyoungk/how-sharding-works-b4dec46b3f6, 12 pages.
MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.
PC Plus, "How to turn an old netbook into a NAS drive," TechRadar, Mar. 1, 2010 [retrieved Feb. 5, 2019], https://www.techradar.com/news/networking/routers-storage/how-to-turn-an-old-netbook-into-a-nas-drive-670757, 12 pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Soltesz et al., "Container-based operating system virtualization: a scalable, high-performance alternative to hypervisors," ACM SIGOPS Operating Systems Review 41 (3):275-287, Mar. 2007.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Third-Party Submission Under 37 CFR 1.290 dated Apr. 24, 2018, U.S. Appl. No. 15/283,017, filed Sep. 30, 2016, 10 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 12, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance Evaluation of Container-based Virtualization for High Performance Computing Environments," Parallel, Distributed, and Network-Based Processing (PDP), 2013 21st Euromicro International Conference, Feb. 2013, pp. 233-240.
Zhao et al., "Experimental Study of Virtual Machine Migration in Support of Reservation of Cluster Resources," Proceedings of the 2nd International Workshop on Virtualization Technology in Distributed Computing, Nov. 2007, pp. 1-8.
Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.
Japanese Decision to Grant a Patent dated Jun. 2, 2020, Patent Application No. 2019-516608, 1 page.
Singaporean Written Opinion dated May 14, 2020, Patent Application No. 11201902518S, 7 pages.
Australian Examination report No. 2 for Standard Patent Application dated Sep. 4, 2020, Patent Application No. 2017336924, 3 pages.
Australian Notice of Acceptance for Patent Application dated Oct. 28, 2020, Patent Application No. 2017336924, 3 pages.
Azaria et al., "MedRec: Using Blockchain for Medical Data Access and Permission Management," 2nd International Conference on Open and Big Data (OBD), Aug. 22, 2016.
European Communication Pursuant to Article 94(3) EPC dated Jul. 1, 2021, Patent Application No. 17783685.5, 12 pages.
Greenspan et al., "MultiChain Private Blockchain—White Paper," http://web.archive.org/web/20150724003212if_/http://www.multichain.com/download/MultiChain-White-Paper.pdf, Jul. 24, 2015, pages.

(56) References Cited

OTHER PUBLICATIONS

Singaporean Second Written Opinion dated Jun. 14, 2021, Patent Application No. 11201902518S, 6 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

* cited by examiner

ARCHIVAL DATA STORAGE FOR STRUCTURED DATA

CROSS REFERENCE TO RELATED APPLICATIONS

This application incorporates by reference for all purposes the full disclosure of co-pending U.S. patent application Ser. No. 15/283,017, filed Sep. 30, 2016, entitled "IMMUTABLE CRYPTOGRAPHICALLY SECURED LEDGER-BACKED DATABASES".

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, has increased the importance of efficiently tracking and indexing data stored and manipulated thereon. Furthermore, as systems scale to meet demand, they tend to become more widely distributed, and coordinating the various components of widely distributed systems becomes increasingly onerous, especially regarding processing of large numbers of data items (e.g., archives) to be encrypted, compressed, replicated, and/or otherwise stored. Examples of such data items include structured data, such as tabular or columnar data, as may be generated by network-connected sensors or other devices, which can have predictable qualities that are not necessarily exploited by existing archival techniques.

BRIEF DESCRIPTION OF THE DRAWINGS

Various techniques will be described with reference to the drawings, in which.

DETAILED DESCRIPTION

Figure 1:
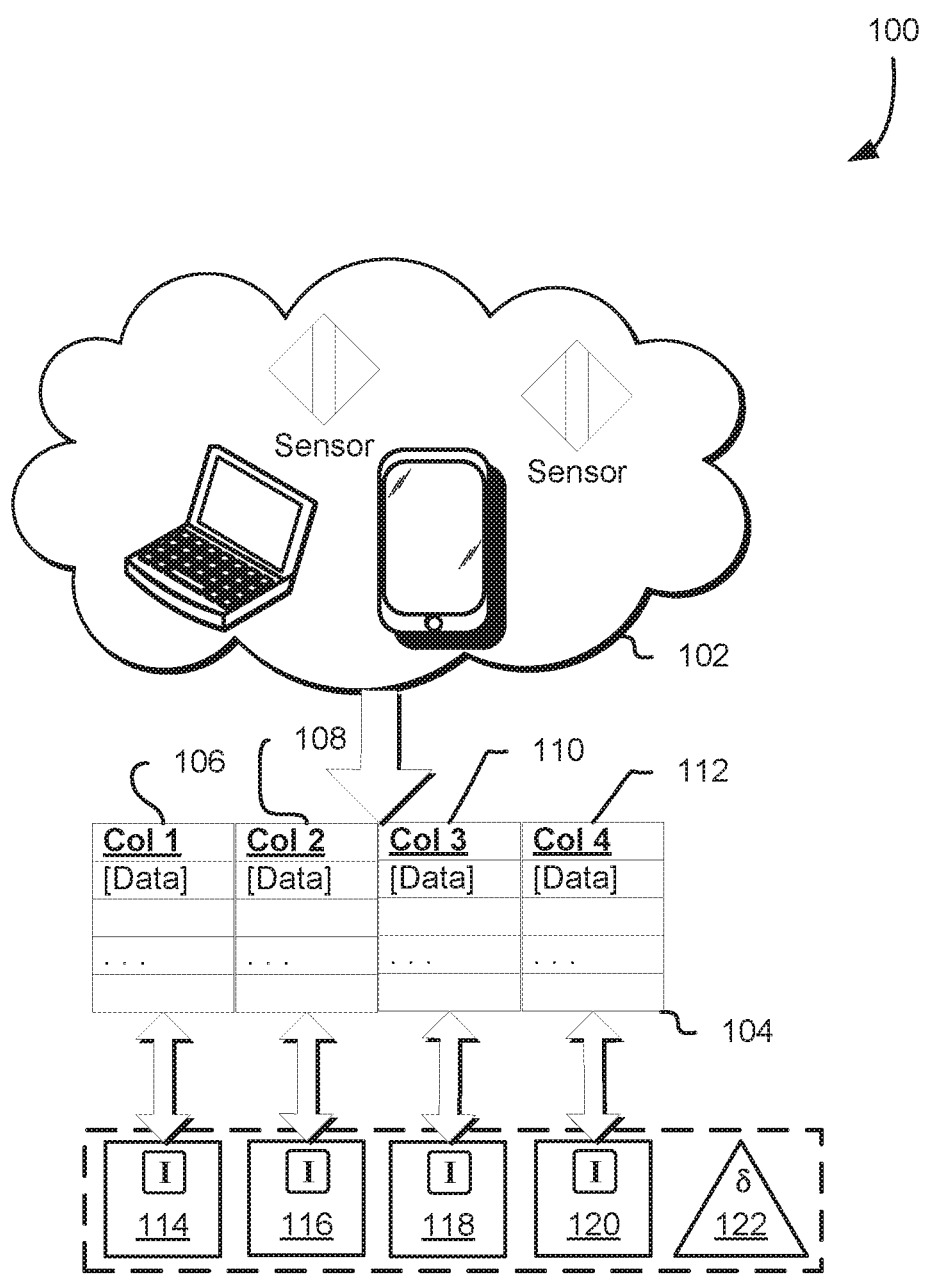
FIG. 1 illustrates an example in which data, such as structured data, is processed into redundancy coded data shards, in accordance with some embodiments.

In one example, user devices, such as network-connected sensors, smartphones, and other computing devices, generate data in columnar, tabular, or otherwise structured form. A system, such as a data storage system (e.g., an archival data storage system), processes such data in preparation for storage, e.g., archival, by transforming the data according to one or more schemas associated with the data. The data transformation may involve separation of a given set of data into a plurality of data components, where each data component corresponds to some segment of the data defined in the schema. For example, if the data is structured in tabular format and includes multiple columns, each data component may correspond to a column of the data. An entity, such as a schema analyzer, may be implemented by the system to determine whether the data conforms to a given schema, and/or to assess the structure of the data from the schema itself (if it is actually available to the system).

The data components are then further processed for storage according to the data storage system implementation. For example, the data storage system may sort and pre-image the data according to a layout optimized for the storage media on which the data is to eventually be stored. For example, the data storage system may implement a data storage vault, which in some embodiments includes a plurality of data storage devices, such that data is written sequentially to the addressable storage of the overall vault in order of a monotonically advancing parameter, such as upload time, associated with the data. The vaults may be addressed (both for reads and for writes) via a map of different "slices" of the overall addressable space represented by the vault as a whole. Such "slices" may correspond in size to the desired size of the images (which, in turn, may be specified in connection with the data storage devices on which they will eventually be stored), and may be defined by time points, along the address space as denominated by, e.g., the upload time of the archives comprising the data to be stored, where a given first time point denotes the start of the slice (inclusive of the specific byte defined in the time point) and a second time point denotes the end of the slice (exclusive of the specific byte correlated with that time point).

As it is possible that a given time point may, for a given slice or image size, not necessarily line up with the start or the end of a given archive, but instead fall on a byte somewhere within the archive, to access a given byte in the system, both a time point (or associated slice) as well as the specific offset (either relative to the slice or to an identified archive within the slice) may be used. A slice map associates the slices (which are, as previously mentioned, defined by the time points) with specific images via their respective identifiers. In some embodiments, the archives have self-describing identifiers, which include an upload timestamp, an identifier or index value, a size (e.g., in bytes) of the archive, and the like. Accordingly, a system implementing the techniques described herein may only need the self-describing identifier to efficiently locate the specific requested archive, without necessitating the indexing of each individual archive.

Given such an example system, it may be contemplated that efficient location in the manner described of a given segment of data stored on the system may be synergistically used in conjunction with one or more characteristics of a redundancy code used to improve durability of the stored data, so as to enable the system to provide additional services related to specific data types. Furthermore, the synergy of such characteristics may be used to improve storage and/or retrieval efficiency, both from the performance and size-on-media perspective, of the stored data. As one example, a metadata engine may capture information regarding the relationship between the generated data components as well as the relationship between those data components and the original data. Such information may be used to group the resultant redundancy coded shards in a way that accounts for such relationships. For example, a system may apply a redundancy code such that the some or all shards associated with a given set of structured data are bundled together. In cases where bundle encoding is used, the bundled shards may include identity shards having one or more data components (corresponding to, e.g., columns of data), and one or more derived shards usable to, in connection with at least one other shard in the bundle, reconstruct any other shard in the bundle.

Accordingly, the system may provide an interface, such as a programmatic interface, allowing requestors to perform queries against archived or otherwise stored structured data. For example, a customer entity or device may perform a query against structured data previously stored using the techniques described. The system processes the query to determine which data set(s) is/are associated with the query, and the specific segments, e.g., columns that need to be read. After determining this information, the system determines one or more self-describing identifier(s) associated with the queried, archived data, and accordingly derives the upload time, the unique archive identifier, and the byte size of the archive. The upload time is correlated with a time point within the vault, which may then be matched with a slice in the vault slice map, which in turn is correlated with a specific image. This process is performed for each portion of data sufficient to execute the query, and, as may be contemplated, multiple images may be retrieved.

In such cases, the some or all of the shards to be retrieved may reside on the same image, or on different images that correspond to shards within the same bundle (if they were bundled together as previously mentioned). In scenarios where two different data components (e.g., on two different shards) to be retrieved are within the same bundle of bundle-encoded shards, in some cases, rather than reading one (or more) of the data components directly from the respective identity shard, the system may read one or more derived shards and reconstruct that data instead. The image(s) are retrieved, and, in the case where the image is associated with its own internal index, a single seek to the location of the specific data component is made, and a byte length correlated with the byte size of the requested archive is read from the start of the location associated with the archive. Depending on the implementation and/or the nature of the query, the associated data components are returned to the requestor for further execution of the query, and/or the system performs the query and returns the results to the requestor.

A placement analyzer may be implemented to further optimize the bundling and/or location of the shards. The placement analyzer may determine a historical record of queries against a given set of structured data, and according to that determination, direct the data storage system to bundle specific shards associated with respective data components such that future queries anticipated by the system may be handled using fewer, or less "expensive" retrievals. In some embodiments, information gathered by the placement analyzer may be used to move shards around (e.g., between bundles) after the respective data components have been committed (e.g., for previously written data, not just for data to be written).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example in which data, such as structured data, is processed into redundancy coded data shards, in accordance with some embodiments.

In some embodiments, user devices 102 generate data 104 in columnar, tabular, or otherwise structured form. The user devices 102 may include any devices capable of providing data to a data storage system via a network. For example, devices 102 may include smartphones, laptops, tablet computers, desktop computers, server computers, network-connected appliances and/or sensors, and the like. The data 104, as mentioned, may be structured data, where the organization of the data may be inherent to the data format itself, defined by a schema included with the submitted data, or defined separately from the data, e.g., by an administrator and/or the user devices themselves in a separate schema. The data may be structured in a tabular, columnar, or other format, where segments of the data itself may correlate to one subtype of the overall data. For example, where the data originates from a network-connected sensor, one segment (e.g., column) of the data may include data of one type (e.g., atmospheric pressure), another segment, e.g., column, includes data of another type (e.g., temperature), and so forth. Such structured file formats include, by way of example, Apache Parquet, Apache Avro, ORC, Google Protocol Buffers, CSV, TSV, JSON, and other data serialization formats.

A system, such as a data storage system (e.g., an archival data storage system) as described in further detail elsewhere herein, processes such data 104 in preparation for storage, e.g., archival, by transforming the data according to the associated schema(s). The data transformation may involve separation of a given set of data into a plurality of data components, where each data component corresponds to some segment of the data defined in the schema. For example, as illustrated, data 104 may be structured in columnar format, including multiple columns 106, 108, 110,112. The system may transform, e.g., by implementing a data transformer as described below, each column 106, 108, 110, 112 into a series of data components corresponding to a respective column of the data.

An entity, such as a schema analyzer, may be implemented by the system to determine whether the data conforms to a given schema, and/or to assess the structure of the data from the schema itself (if it is actually available to the system). As mentioned, the schema may be implied from the data itself (e.g., the schema may assess the raw incoming data to determine its organization/structure). Alternatively or in addition, the schema may be discretely defined within the data itself as a separate portion of the incoming data (e.g., header, etc.). As another example, the data format may imply the organization of the data. As yet another example, the schema may be specified and/or defined through a separate process (e.g., provided by a requestor, etc.).

After determining the organization of the data, e.g., to determine which portions of the incoming data correspond to one or more columns 106, 108, 110, 112, the resultant data components are then further processed for storage according to the data storage system implementation. For example, the data storage system may sort and pre-image the data according to a layout optimized for the storage media on which the data is to eventually be stored, in a fashion described in further detail herein. A metadata engine, as described in further detail below, may capture information regarding the relationship between the generated data components as well as the relationship between those data components and the original data.

Furthermore, the system may apply a redundancy code used to improve durability of the stored data. As an example, each data component resulting from a given column 106, 108, 110, 112 may be encoded into one or more identity shards 114, 116, 118, 120, e.g., on a one-to-one basis. The metadata determined and/or captured by the metadata engine may be used to group the resultant redundancy coded shards in a way that accounts for the relationships between the data components, and thus, the originating segments of the original data. For example, a system may apply a redundancy code such that the some or all shards associated with a given set of structured data are bundled together in a bundle of bundle-encoded shards. In cases where bundle encoding is used, the bundled shards may include identity shards 114, 116, 118, 120 having one or more data components (corresponding to, e.g., columns of data), and one or more derived shards 122 usable to, in connection with at least one other shard in the bundle, reconstruct any other shard in the bundle. For example, in the illustrated example, if the n:k ratio is 4:5 (i.e., any four shards may be used to reconstruct the remaining shard), it may be contemplated that a retrieval involving columns 1, 3, and 4 may be read directly from identity shards 114, 118, and 120, while column 2 may be read either directly from identity shard 116 or reconstructed from the identity shards 114, 118, 120, and derived shards 122. As such, even if one shard involved in a given retrieval is missing or otherwise unavailable, in this case, no "additional" shards than that which was initially sufficient to perform the original retrieval job need be retrieved (with only the additional computational burden of reconstruction).

Figure 2:
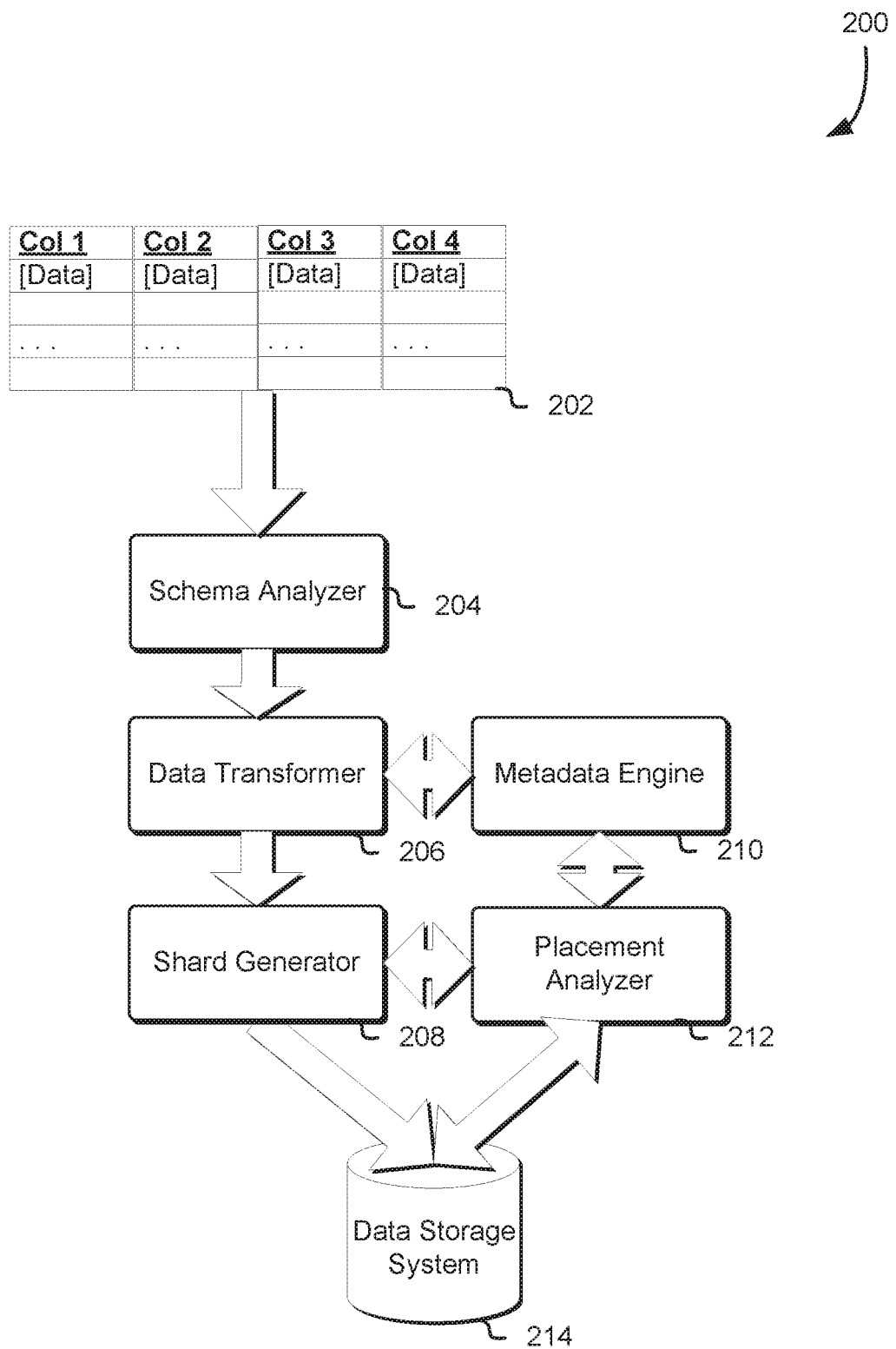
FIG. 2 illustrates an example in which data, such as structured data, flows through a series of processing entities for storage preparation in a data storage system, such as an archival data storage system, in accordance with some embodiments.

FIG. 2 illustrates an example in which data, such as structured data, flows through a series of processing entities for storage preparation in a data storage system, such as an archival data storage system, in accordance with some embodiments.

Data 202, such as structured data generated by network-connected devices and submitted, e.g., through a programmatic interface provided by a data storage system 214, for storage on the data storage system 214, and then processed using one or more of a schema analyzer 204, a data transformer 206, a metadata engine 210, a shard generator 208, and/or a placement analyzer 212.

The schema analyzer 204, the data transformer 206, the metadata engine 210, the shard generator 208, and/or the placement analyzer 212 may be implemented by a data storage system 214 and/or a computing resource service provider using any computational resources of said system or provider. Additionally, one or more of the schema analyzer 204, the data transformer 206, the metadata engine 210, the shard generator 208, and/or the placement analyzer 212 may be parallelized, e.g., have a plurality of workers, threads, or other computation entities, operating in a distributed and/or decentralized manner. For example, the computational resources used may include discrete entities, such as processors, memory, storage devices, and/or the like, virtualized abstractions thereof (such as virtual machines), or some combination thereof.

Similarly, data stores used to store work items, metadata (e.g., by the metadata engine 210), or to hold processed archive data, may be implemented as databases, key-value stores, services providing such services, physical data storage media, and the like. Furthermore, queued work items may be held in an implemented queue local to the implementing system, by a remote service providing, e.g., guaranteed-order queueing, and the like.

The data 202 is first analyzed by a schema analyzer 204, as previously mentioned, to determine an organization or structure of the incoming data. The schema analyzer 204 determines whether the data conforms to a given schema, and/or to assess the structure of the data from the schema itself (if it is actually available to the system). As mentioned, the schema may be implied from the data itself (e.g., the schema may assess the raw incoming data to determine its organization/structure). Alternatively or in addition, the schema may be discretely defined within the data itself as a separate portion of the incoming data (e.g., header, etc.). As another example, the data format may imply the organization of the data. As yet another example, the schema may be specified and/or defined through a separate process (e.g., provided by a requestor, etc.).

According to the determinations of the schema analyzer 204, the data transformer 206 separates the incoming data into data components, as mentioned, corresponding to segments of the data (e.g., columns, etc.). The metadata engine 210 captures metadata regarding the associations between the now separated data components, as between the data components as well as with the parent data (e.g., the data prior to transformation).

The transformed data components are then processed by the shard generator 208 to generate a plurality of redundancy coded shards, and in some cases, generates bundles of such shards where the original data associated with the data components are stored in identity shards and the bundle additionally contains one or more derived shards. The specific bundling, e.g., which "columns" or other segments are bundled together by way of how the shards are combined in a given bundle, may be determined by a placement analyzer 212. As mentioned, the placement analyzer may determine a historical record of queries against a given set of structured data, and according to that determination, direct the data storage system 214 to bundle specific shards associated with respective data components such that future queries anticipated by the system may be handled using fewer, or less "expensive" retrievals. In some embodiments, information gathered by the placement analyzer may be used to move shards around (e.g., between bundles) after the respective data components have been committed (e.g., for previously written data, not just for data to be written).

As mentioned, the system 214 may also provide an interface, such as a programmatic interface, user interface, or web service call, allowing requestors to perform queries against archived or otherwise stored structured data. For example, a customer entity or device may perform a query against structured data previously stored using the techniques described. The system processes the query to determine which data set(s) is/are associated with the query, and the specific segments, e.g., columns that need to be read. After determining this information, the system determines one or more self-describing identifier(s) associated with the queried, archived data, and accordingly derives the upload time, the unique archive identifier, and the byte size of the archive. The upload time is correlated with a time point within the vault, which may then be matched with a slice in the vault slice map, which in turn is correlated with a specific image. This process is performed for each portion of data sufficient to execute the query, and, as may be contemplated, multiple images may be retrieved.

Some or all of the shards to be retrieved may reside on the same image, or on different images that correspond to shards within the same bundle (if they were bundled together as previously mentioned). In scenarios where two different data components (e.g., on two different shards) to be retrieved are within the same bundle of bundle-encoded shards, in some cases, rather than reading one (or more) of the data components directly from the respective identity shard, the system may read one or more derived shards and reconstruct that data instead. The image(s) are retrieved, and, in the case where the image is associated with its own internal index, a single seek to the location of the specific data component is made, and a byte length correlated with the byte size of the requested archive is read from the start of the location associated with the archive. Depending on the implementation and/or the nature of the query, the associated data components are returned to the requestor for further execution of the query, and/or the system performs the query and returns the results to the requestor.

Figure 3:
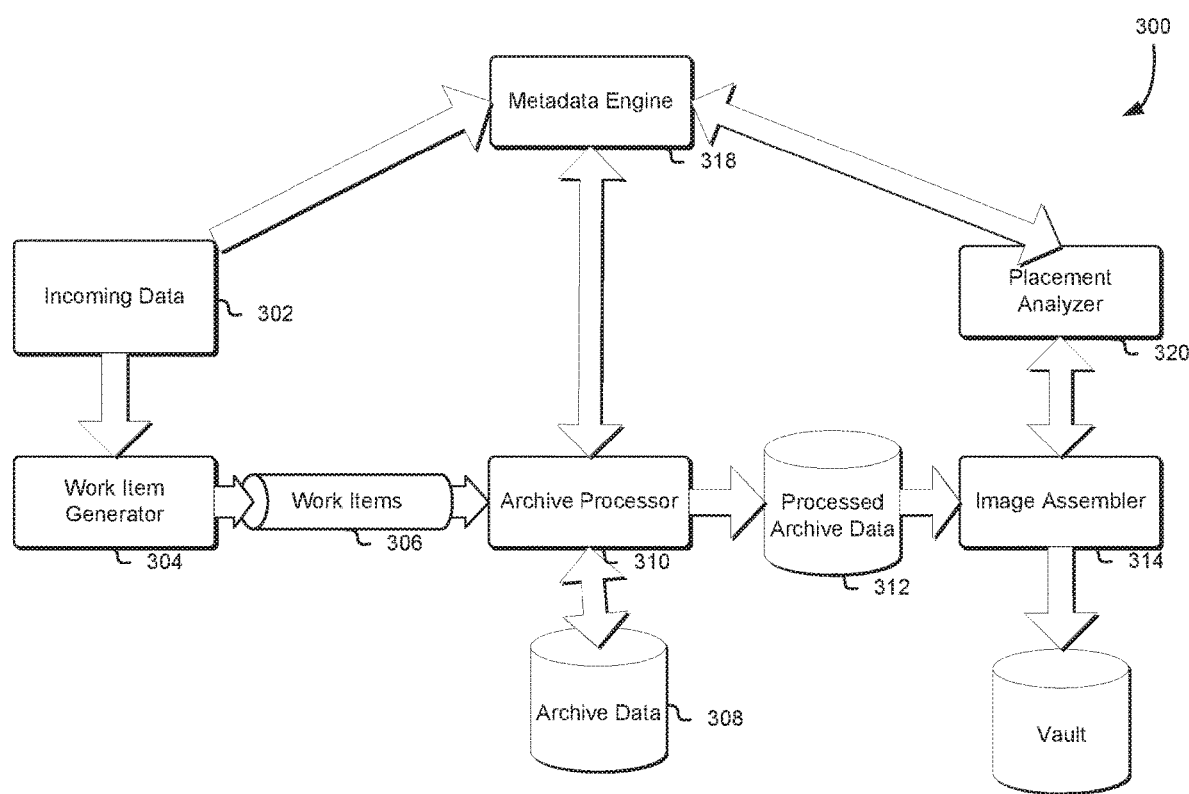
FIG. 3 illustrates an example environment that ingests and processes data, including structured data, to be sorted, indexed, transformed, and stored, in accordance with some embodiments.

FIG. 3 illustrates an example environment that ingests and processes data, including structured data, to be sorted, indexed, transformed, and stored, in accordance with some embodiments.

The processing of the data just mentioned may be greatly enhanced, from an efficiency standpoint, by utilizing distributed computing techniques to parallelize the processing using a plurality of workers (e.g., resources of the implementing computing resource service provider capable of performing the processing tasks). Parallelized processing must be carefully orchestrated to, e.g., preserve monotonic and/or invariant order, as well as the continuity, of the archives/vault portions being processed and stored. Accordingly, an implementing system may include a work item generator 304 and an archive processor 310 that track and process smaller portions of the data, such as data components, in the same order as the data to be written to the eventual data storage device(s), e.g., corresponding to an implementing data storage vault 316. Additionally, the system may implement an image assembler 314 to reorder the resultant work items into larger images to be written as previously described, where the images also retain the necessary sort order. As previously mentioned, the incoming data 302 may, during processing, result in metadata related to the association between individual data components after transformation. Also as previously noted, the metadata engine 318 may track and store such metadata, and interact with both the archive processor 310 (which may implement, e.g., several functionalities mentioned above in connection with FIG. 2, including one or more of the schema analyzer 204, the data transformer 206, and/or the shard generator 208) and the placement analyzer 320 in similar fashion as previously described.

The work item generator 304, the archive processor 310, and the image assembler 314 may, as with metadata engine 318 and placement analyzer 320, be implemented by a data storage system and/or a computing resource service provider using any computational resources of said system or provider. Additionally, one or more of the aforementioned components may be parallelized, e.g., have a plurality of workers, threads, or other computation entities, operating in a distributed and/or decentralized manner. For example, the computational resources used may include discrete entities, such as processors, memory, storage devices, and/or the like, virtualized abstractions thereof (such as virtual machines), or some combination thereof.

Similarly, data stores used to store work items (e.g., 308) or to hold processed archive data (e.g., 312), may be implemented as databases, key-value stores, services providing such services, physical data storage media, and the like. Furthermore, queued work items may be held in an implemented queue local to the implementing system, by a remote service providing, e.g., guaranteed-order queueing, and the like.

In the illustrated example, a work item generator 304 breaks a plurality of archives or other incoming data 302, such as a series of archives arranged and/or sorted by order of upload, into processible chunks or work items, each work item having a consistent size that may, e.g., be tunable based to the particular characteristics of the archive processor 310. The work item generator 304 may generate a sort order for the archives represented in the work items, in a similar way as the overall vault contents are sorted, and the sort order may be preserved in, e.g., a work item table (which may be implemented in a key-value store or other database).

The work items are placed in a queue 306 for the archive processor 310, which may include a plurality of workers as previously mentioned. In parallelized/distributed implementations, any available worker of the archive processor may take any work item and process the underlying data (e.g., prepare for storage by compressing and/or encrypting) in any order. The completed work items are held, e.g., in a staging data store 312, until an image assembler 314 determines that a sufficient quantity of temporally and byte-contiguous work items have been processed to generate an image of the determined size.

Such a determination may be made in the context of the generation of contiguous vault slices, while a given worker may continue to work to process work items as new data continues to arrive. As may be contemplated, data may arrive at unpredictable times and in bursty quantities. Additionally, a distributed system having a plurality of workers may require a mechanism by which to avoid having a given worker process the same work item or archive already being processed by another worker, as well as to avoid having different portions of the distributed system unsuspectingly process work items (or archives or images) along different and competing paradigms.

The archive processor 310 performs operation to prepare the work items 306 for eventual assembly and storage. Along with the compression and encryption mentioned, other techniques may be performed, such as those described in FIG. 2 above. For example, the data transformation of the incoming data 302 into its data components may be performed, as well as generation and tracking of metadata associating the data components with each other and with the incoming data 302. After compression and/or encryption, the output of the archive processor is then assembled by the image assembler 314, as mentioned, according to one or more determinations of the placement analyzer 320, as previously described.

As mentioned, an example implementation involves writing to the addressable storage of the overall vault 316 in order of a monotonically advancing parameter associated with the data. For example, the monotonically advancing parameter is an upload time for a given portion of data to be written (such as incoming data 302 intended to be written to durable storage associated with a data storage system). In some embodiments, the data 302 is of arbitrary size (in, e.g., bytes) and may include a self-describing identifier, an upload timestamp, and an encapsulated data payload. The self-describing identifier may, for example, be an encrypted version (or an output of a hash function) of metadata associated with the archive. Such information may include an index or other identifier assigned to the data by the data storage system (which itself may assigned in a monotonically increasing order), a size (e.g., byte length) of the data payload and/or the entire archive, and the like. Furthermore, the self-describing identifier may include the upload timestamp.

The parameter used for the primary sort, in an embodiment, is the upload timestamp. In the illustrated example, as the upload time inherently moves forward (an inherent quality of time), it may be considered monotonically advancing and used as the primary sort order. To the extent that two or more sets of data share the same parameter value (e.g., even for a monotonic function, two subsequent inputs may result in the same value, such as would be the case if two archives were uploaded at precisely the same time, as would be possible in a distributed system), one or more other parameters, such as the unique identifiers associated with the archives themselves, can be used as a secondary sort.

Various data structures, such as vault slice tables and work item tables, may be implemented to track specific time points in a predictable way, e.g., by having a system-wide, published, known paradigm for where the specific time points will be (e.g., based on presumptions or predetermination of the slice characteristics they define). Furthermore, in some embodiments, the system may define the slices such that the initial/start time point is inclusive of the byte it represents, while the final/end time point of a given slice is exclusive of the byte it represents (e.g., the time point is one byte after the last byte in the slice), such as would be the case if the initial time point is used as the invariant key for each subsequent slice. In some of such implementations, if a time point entry exists in the table, a worker may assume that the work items and/or archives within the slice for which that time point is an initial time point are already being assembled, processed, etc., and may then move on to the next available set of work items, archives, images, etc.

As data storage devices, such as tape media, may be of generally uniform size, and/or a partitioning scheme used by such devices may involve images of a specified size, in some embodiments, the slices are of a consistent size that corresponds to the desired size of the images (which, in turn, may be specified in connection with the data storage devices on which they will eventually be stored). A vault slice map associates the slices with specific images via their respective identifiers. Accordingly, a system implementing the techniques described herein, may only need the self-describing identifier to efficiently locate the specific requested set of data, without needing to index each individual portion in a central index.

For example, a customer entity or device may submit a request, such as a query involving data previously stored using the techniques described. Once derived or received, the specific data components for servicing the query are identified, and the self-describing identifiers associated with those data components is determined by the receiving entity. The upload time(s) are derived from the identifiers, correlated with a time point within the vault, which may then be matched with one or more slices in the vault slice map, which in turn is correlated with one or more specific images. Since the vault slice map is continuous with respect to the bytes represented in the vault (e.g., of the archives), and is arranged in increasing order of upload time, a simple lookup within the vault slice map to match, e.g., the key of the storing key-value store (where the key is the initial time point of each slice) with the relevant slice, is sufficient to locate the respective image. The image(s), or portions thereof, are retrieved from one or more relevant data storage devices associated with the vault 316 and, as previously mentioned, the retrieved data is either presented to the customer device (or other entity) for further processing of the query, or the system itself performs the query on the retrieved data and returns the result to the requestor.

Figure 4:
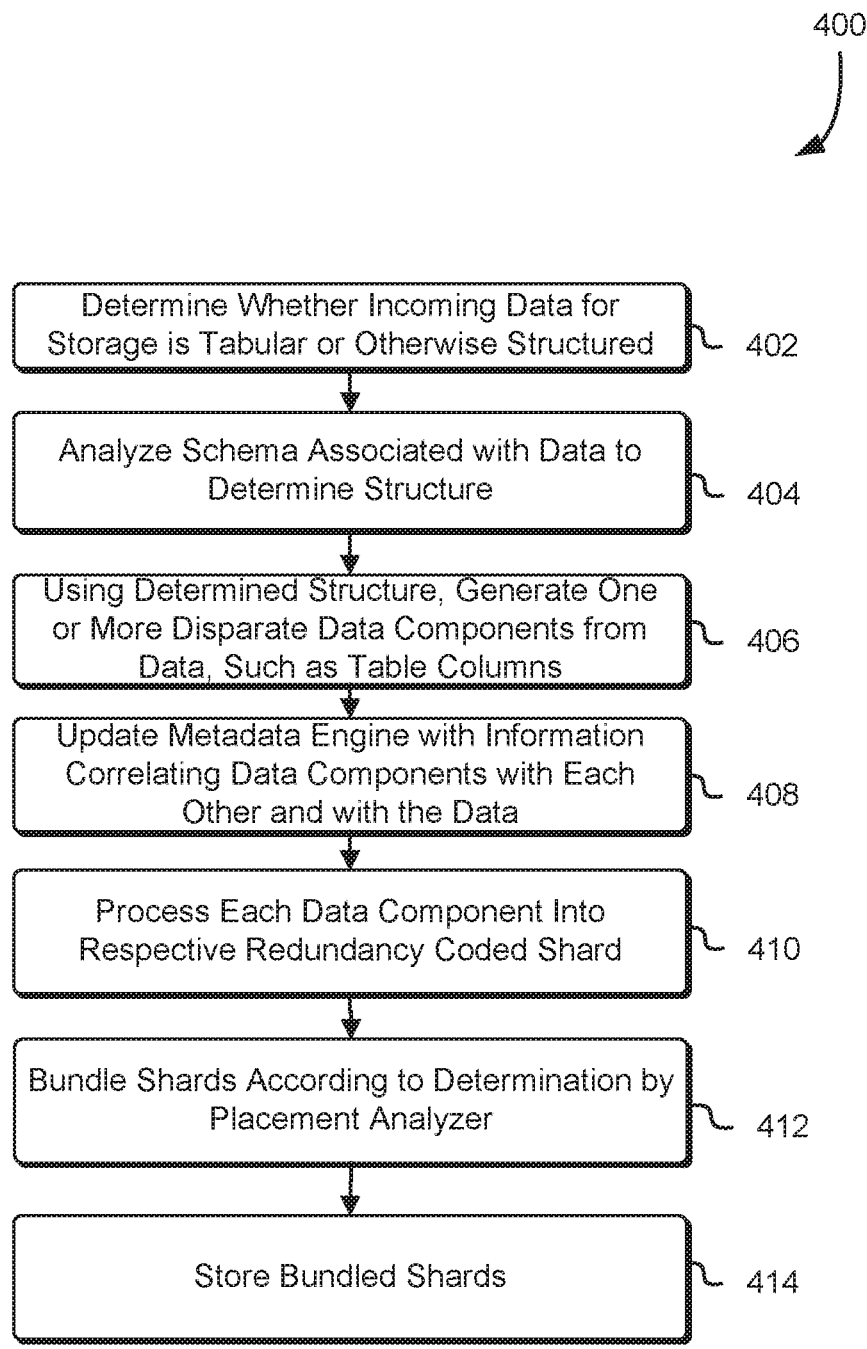
FIG. 4 illustrates an example process for processing and storing structured data in accordance with a schema associated with the data, in accordance with some embodiments.

FIG. 4 illustrates an example process for processing and storing structured data in accordance with a schema associated with the data, in accordance with some embodiments.

At step 402, an entity, such as a schema analyzer, determines whether incoming data for storage is tabular or otherwise structured. If the data is determined to have a known structure, the associated schema is further analyzed by the schema analyzer at step 404 to determine details regarding the structures, such as the identity of data columns or other data segments/structure.

At step 406, based on the columns and/or other structure determined in step 404, data components are generated, e.g., on a one-to-one basis, using a data transformer, as previously mentioned in connection with FIGS. 1-3. As mentioned, such data components may be associated with columns of the data.

At step 408, metadata is generated and stored by the metadata engine that correlates the resultant data components with each other and which the incoming data at step 402, and at step 410, the data components are processed by a shard generator to generate redundancy coded shards. In some embodiments, the data components map one-to-one to the resultant shards. However, multiple data components (and thus columns) may be mapped to a given shard.

At step 412, a placement analyzer directs bundling of the shards into, e.g., bundles of bundle-encoded shards, so as to predictively correlate ease/efficiency of retrieval thereof for future queries based at least on a history of prior queries against the same data set, and the bundles generated in step 412 are stored in one or more data storage devices at step 414.

Figure 5:
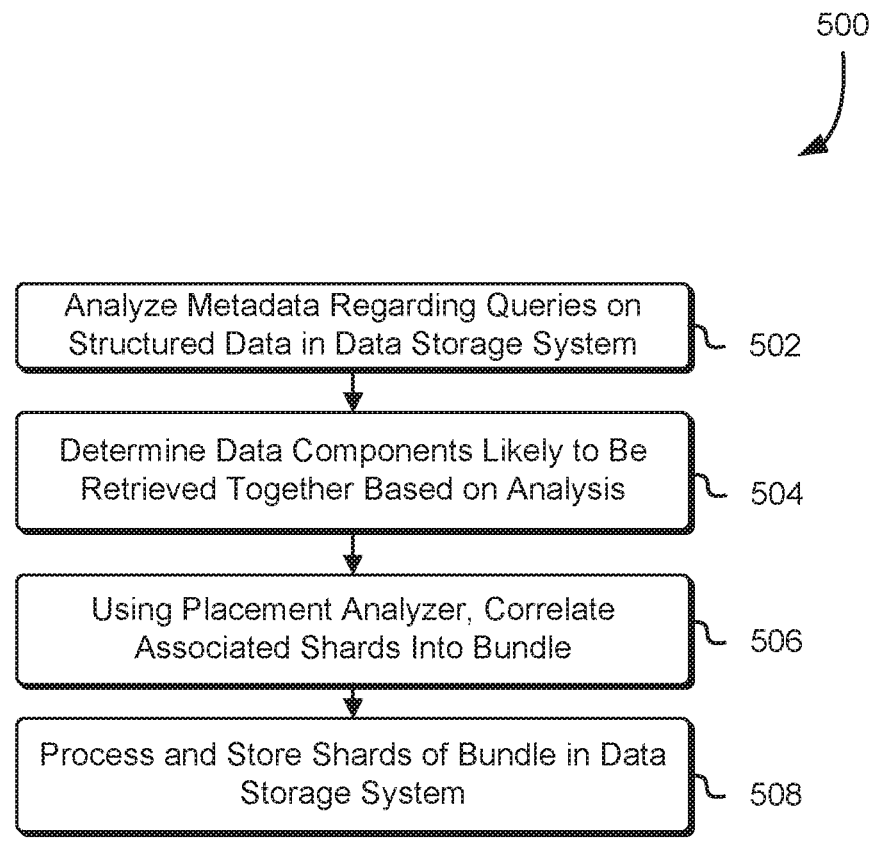
FIG. 5 illustrates an example process for analyzing metadata associated with structured data to determine bundling of resultant redundancy coded shards, in accordance with some embodiments.

FIG. 5 illustrates an example process for analyzing metadata associated with structured data to determine bundling of resultant redundancy coded shards, in accordance with some embodiments.

At step 502, a metadata engine and/or placement analyzer or similar entity analyzes metadata regarding prior queries against a structured data set stored in a data storage system, and, at step 504, determines based at least in part on that history which data components of that structured data set are likely to be retrieved together in future queries.

At step 506, the information determined in step 504 are used to place individual shards corresponding to those data components into one or more bundles. For example, the reconstruction characteristics, efficiency of retrieval, etc., is taken into account when determining how to bundle given shards together based on the query history as determined in step 502. At step 508, the bundles of shards are stored in accordance with the determinations previously mentioned.

Figure 6:
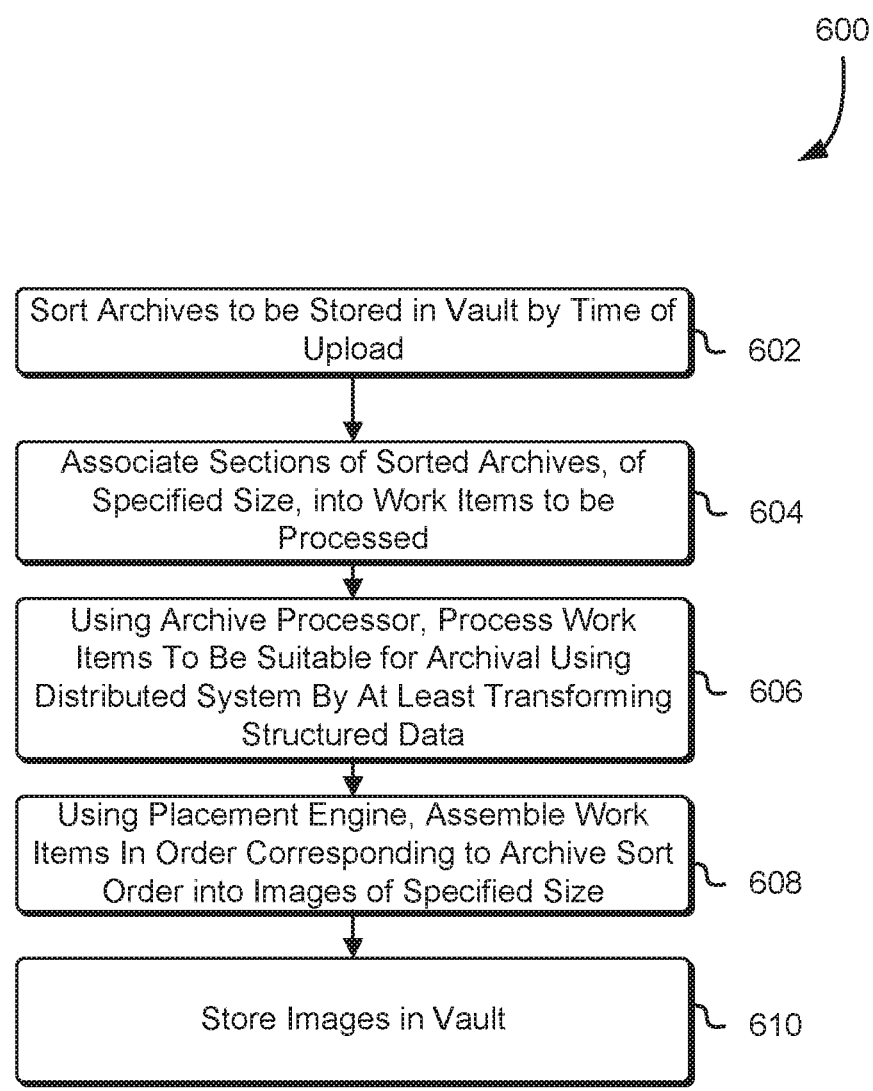
FIG. 6 illustrates an example process for generating work items and assembling writable images therefrom, in accordance with some embodiments.

FIG. 6 illustrates an example process for generating work items and assembling writable images therefrom, in accordance with some embodiments.

At step 602, data to be stored in a given vault is ingested, e.g., by request or importation, and sorted into a specified order relative to a monotonically increasing parameter, such as time of upload, and using previously described techniques. At step 604, portions of the overall load of data is aggregated into work items of a specified size, generally smaller than that of the image as a whole, while retaining similar properties (e.g., continuity, monotonicity, invariancy at least of each initial time point) to the sorted vault contents as previously described (but on a smaller scale).

At step 606, the work items as generated in step 604 are processed for archival, e.g., using at least part of the process described in connection with FIGS. 4-5 above, preparing, for storage, such as by transforming, compressing, encrypting, identifying, etc. the data within the work items. As previously discussed, the work items may be consumed and processed in any order, as the sort order had previously been determined and stored for future reassembly.

At step 608, after a sufficient quantity of contiguous work items (according to the table generated in connection with step 602 and 604), an entity, such as an image reassembler as previously described, assembles the work items into the previously determined order (and as influenced by a placement analyzer, as mentioned) to form one or more images, and at step 610, those images are stored in the designated vault.

Figure 7:
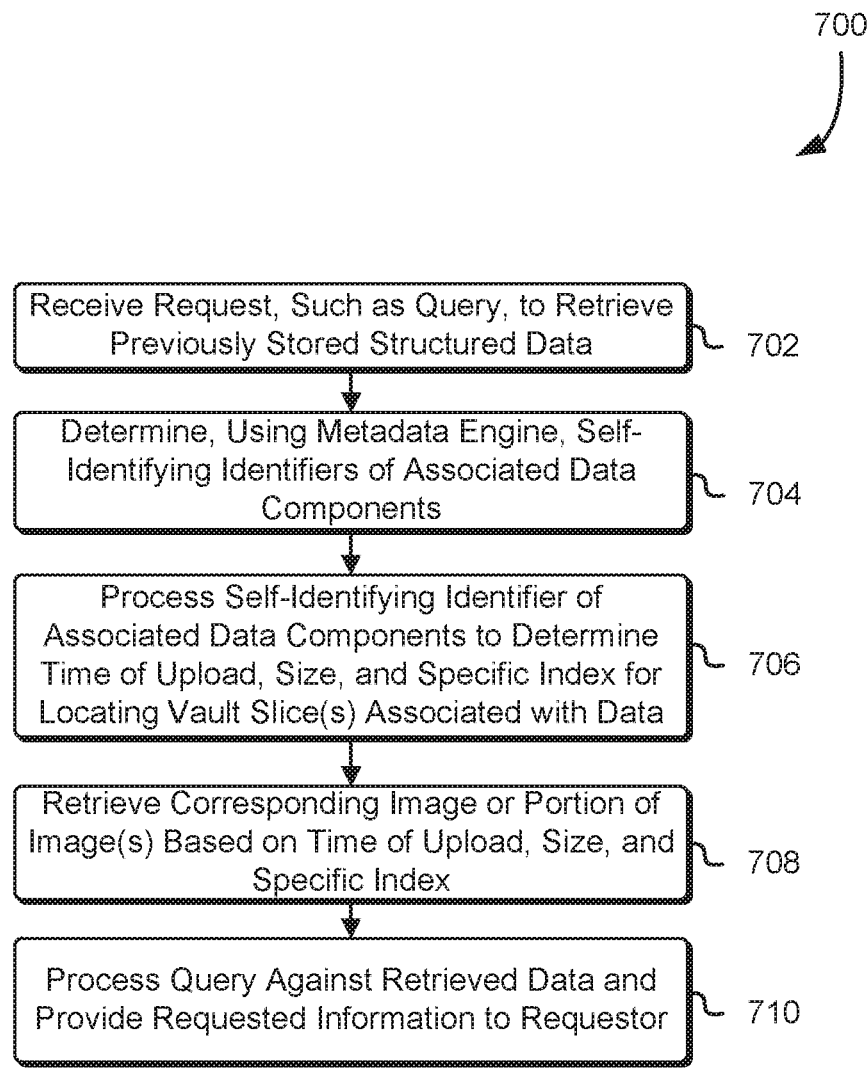
FIG. 7 illustrates an example process for processing queries against structured data stored on a system that stores archives based on one or more monotonically advancing parameters, in accordance with some embodiments.

FIG. 7 illustrates an example process for processing queries against structured data stored on a system that stores archives based on one or more monotonically advancing parameters, in accordance with some embodiments.

At step 702, a request is received from, e.g., a customer entity, to query previously stored structured data. At step 704, self-describing identifiers associated with the data is processed, e.g., by the data storage system, to determine the time of upload, size, and/or other unique identifier associated with the corresponding data, e.g., using metadata describing the relationships between the query, the queried data, and the respective data components resulting from that data at the time of transformation/storage.

At step 706, the time of upload, size, and specific index is used to locate the associated vault slice(s)/image(s), and at step 708, the corresponding image(s) with the mapped identifier is retrieved from the vault. At step 710, the requested data is then located and provided to the requestor or another entity for processing of the query (or, in some cases, the system performs the query directly on the retrieved data and provides the outcome to the requestor).

Figure 8:
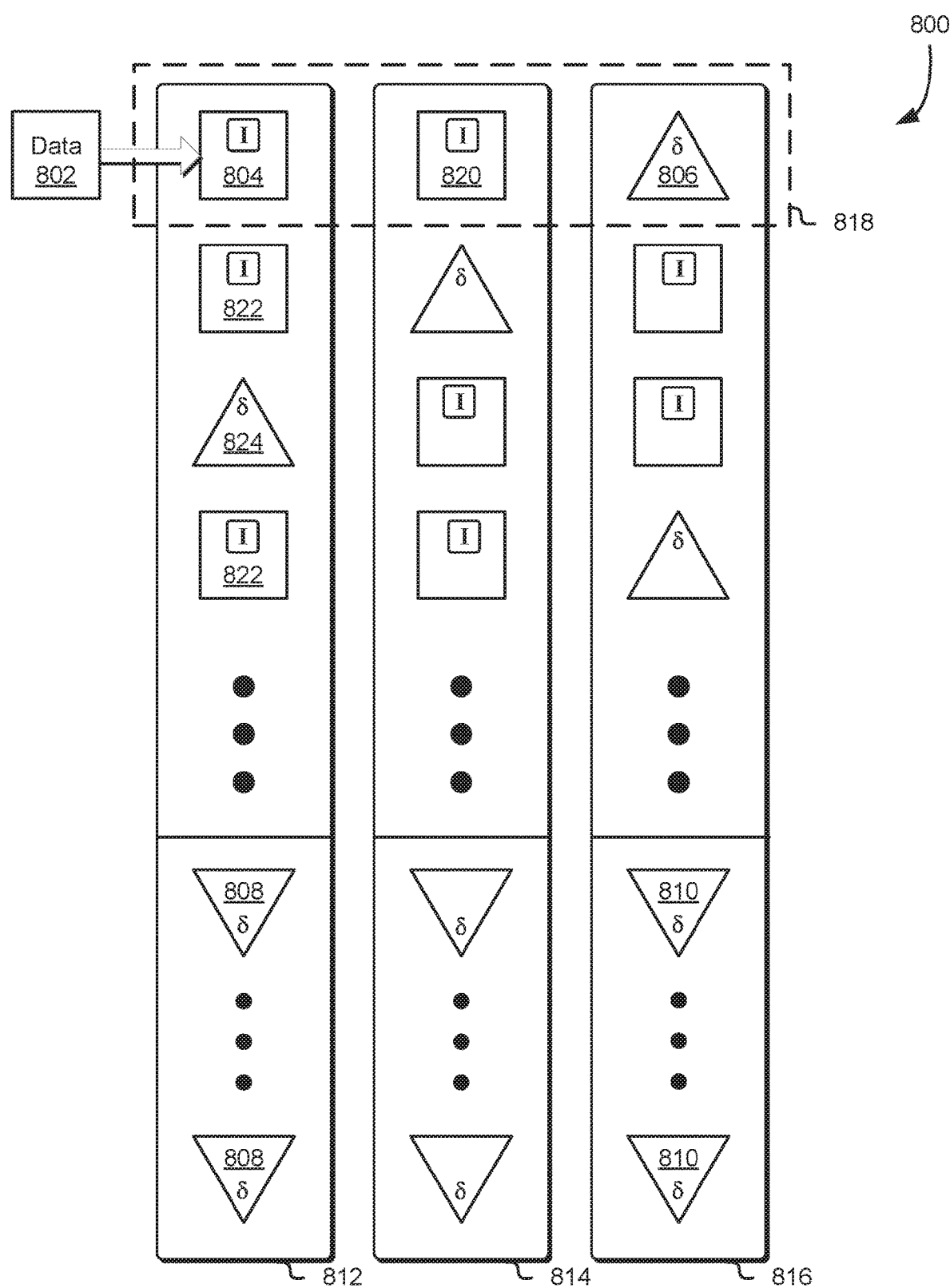
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described and in accordance with an embodiment. The redundancy encoding technique illustrated in FIG. 8 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 8, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 8, data 802 from preliminary storage is provided for storage in durable storage using a redundancy encoding technique with both horizontal derived shards and vertical derived shards. In the example illustrated in FIG. 8, a first datacenter 812 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 812. A second datacenter 814, which may be geographically and/or logically separate from the first datacenter 812, may also contain data shards, horizontal derived shards, and/or vertical derived shards. A third datacenter 816, which may be geographically and/or logically separate from the first datacenter 812 and from the second datacenter 814, may also contain data shards, horizontal derived shards, and/or vertical derived shards. As illustrated in FIG. 8, each of the three datacenters may be a single vertical bundle. In an embodiment, each of the datacenters can include multiple vertical bundles. As may be contemplated, the number of datacenters illustrated in FIG. 8 and/or the composition of the datacenters illustrated in FIG. 8 are merely illustrative examples and other numbers and/or compositions of datacenters may be considered as within the scope of the present disclosure. The datacenters may be co-located or may be located in one or more separate datacenter locations.

In the example illustrated in FIG. 8, the data 802 may be copied to a data shard 804 and, as a result of the change to the data in the data shard 804, a horizontal derived shard 806 associated with the data shard 804 may be updated so that the horizontal derived shard 806 may be used to reconstruct the data shard 804 in the event of a loss of the data shard 804. In the example illustrated in FIG. 8, the three shards enclosed by the dotted line (e.g., the data shard 804, the data shard 820, and the horizontal derived shard 806) are a horizontal bundle 818. In this example, the data shard 820 is not affected by the changes to the data shard 804 but the horizontal derived shard 806 may need to be updated as a result of the changes to the data shard 804.

Also as a result of the change to the data in the data shard 804, one or more vertical derived shards 808 related to the data shard 804 may also be updated so that the vertical derived shards 808 may be used to reconstruct the data shard 804 in the event of a loss of the data shard 804 and the horizontal derived shard 806. In the example illustrated in FIG. 8, the shards in datacenter 812 form a vertical bundle. In this example, the other data shards 822 in the vertical bundle and/or the horizontal derived shards 824 in the vertical bundle are not affected by the changes to the data shard 804 but the vertical derived shards 808 may need to be updated as a result of the changes to the data shard 804. Finally, as a result of the change to the horizontal derived shard 806, one or more vertical derived shards 810 related to the horizontal derived shard 806 in the vertical bundle in datacenter 816 may also be updated so that the vertical derived shards 810 may be used to reconstruct the horizontal derived shard 806 in the event of a loss of the horizontal derived shard 806 and the data shard 804.

Figure 9:
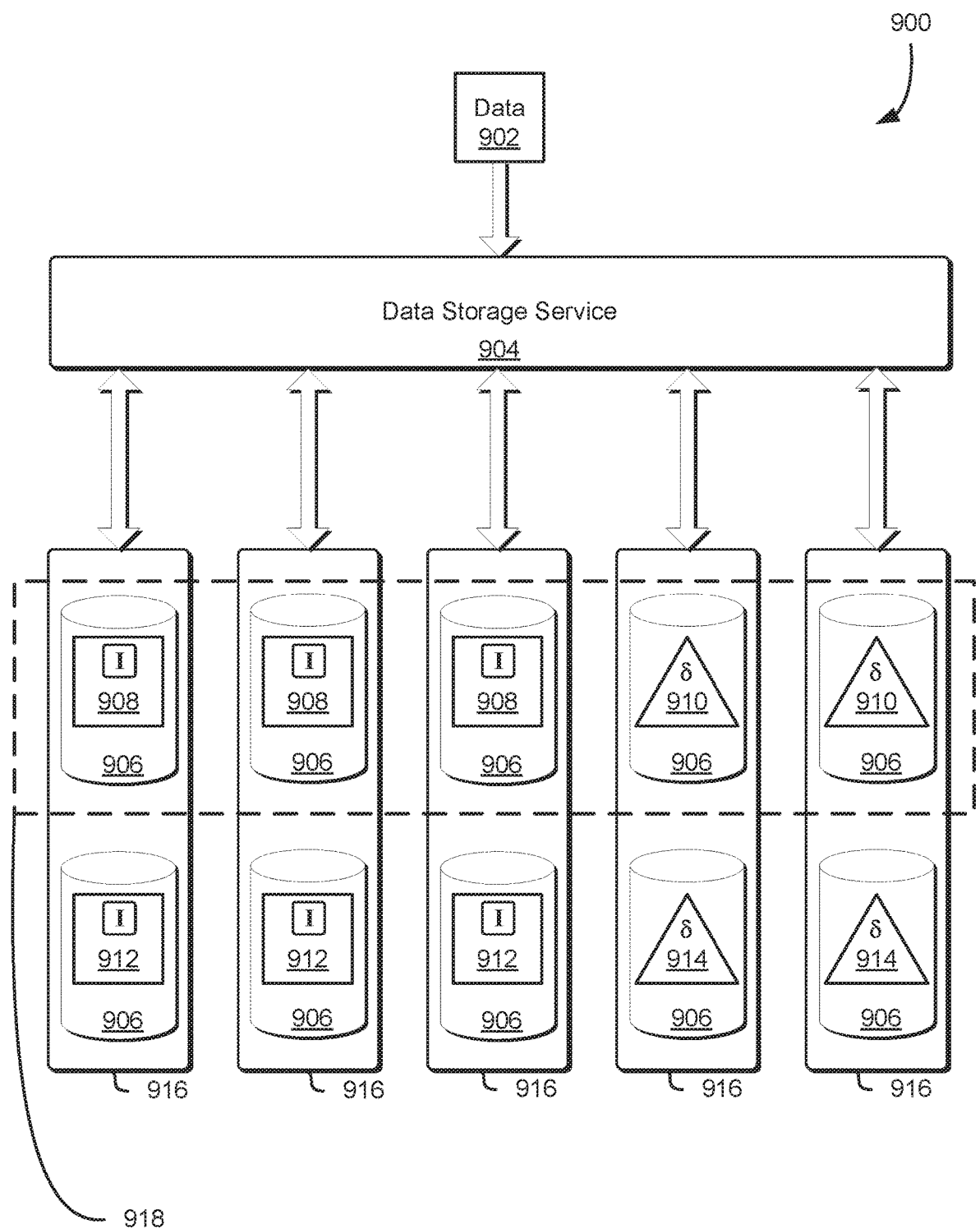
FIG. 9 illustrates an example environment where a redundancy encoding technique is applied to data stored in durable storage in accordance with at least one embodiment.

FIG. 9 illustrates an example environment 900 where a redundancy encoding technique is applied to data stored in durable storage and in accordance with at least one embodiment. The redundancy encoding technique illustrated in FIG. 9 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 902 from preliminary storage may be sent to a data storage system 904 for redundant storage. The data 902 may be provided from the preliminary storage by any entity capable of transacting data with a data storage system, such as over a network (including the Internet). Examples include physical computing systems (e.g., servers, desktop computers, laptop computers, thin clients, and handheld devices, such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like.

The data storage system 904 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like. In some embodiments, the resources of the data storage system 904, as well as the data storage system 904 itself, may be one or more resources of a computing resource service provider, such as that described in further detail below. In some embodiments, the data storage system 904 and/or the computing resource service provider provides one or more archival storage services and/or data storage services, such as those described herein, through which a client entity may provide data such as the data 902 for storage in preliminary storage and/or the data storage system 904.

Data 902 may include any quantity of data in any format. For example, the data 902 may be a single file or may include several files. The data 902 may also be encrypted by, for example, a component of the data storage system 904 after the receipt of the data 902 in response to a request made by a customer of the data storage system 904 and/or by a customer of computing resource service provider.

The data storage system 904 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 904), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 904, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 904. For example, a data storage system 904 may generate a dense index for archives over a specified size (as the size of the index itself may be small relative to the number of archives stored on a given volume), and may also generate a sparse index for archives under that specified size (as the ratio of index size to archive size increases).

The data storage system 904 is connected to or includes one or more volumes 906 on which archives or identity shards may be stored. The generated indices for the archives may also be stored on the one or more volumes 906. The volumes 906 may be any container, whether logical or physical, capable of storing or addressing data stored therein. In some embodiments, the volumes 906 may map on a one-to-one basis with the data storage devices on which they reside (and, in some embodiments, may actually be the data storage devices themselves). In some embodiments, the size and/or quantity of the volumes 906 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 906, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 906.

In some embodiments, the sparse indices are used in connection with information relating to the sort order of the archives so as to locate archives without necessitating the use of dense indices, for example, those that account for every archive on a given volume. Such sort order-related information may reside on the volumes 906 or, in some embodiments, on an entity separate from the volumes 906, such as in a data store or other resource of a computing resource service provider. Similarly, the indices may be stored on the same volumes 906 to which they apply, or, in some embodiments, separately from such volumes 906.

The archives may be stored, bit for bit (e.g., the "original data" of the archives), on a subset of the plurality of volumes 906. Also as mentioned, appropriate indices may also be stored on the applicable subset of the plurality of volumes 906. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 9 illustrates five volumes, three of which contain original data archives 908 and two of which contain derived data 910, such as redundancy encoded data. In the illustrated example, the redundancy code used may require any three shards to regenerate original data, and therefore, a quantity of three volumes may be used to write the original data (even prior to any application of the redundancy code).

The volumes 906 bearing the original data archives 908 may each contain or be considered as shards unto themselves. For example, the data 902 from preliminary storage may be copied directly only to a volume if, as described herein, it is stored in preliminary storage as an identity shard. In embodiments where the sort order-related information and/or the indices are stored on the applicable volumes 906, they may be included with the original data of the archives and stored therewith as shards, as previously mentioned. In the illustrated example, the original data archives 908 are stored as three shards (which may include the respective indices) on three associated volumes 906. In some embodiments, the original data archives 908 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 908 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 9, the five volumes 906 include three volumes that have shards (e.g., identity shards) corresponding to the original data of the original data archives 908, while two have encoded shards corresponding to the derived data 910 (also referred to herein as "derived shards"). As illustrated in FIG. 9, the three original data archives 908, and the two encoded shards corresponding to the derived data 910 form a bundle 918 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 906 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 904, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 904 may locate, based on information regarding the sort order of the archives as stored on the volumes 906, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 904 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 904 may first determine the size of the requested archive, and if the requested archive is larger than or equal to the aforementioned size boundary, the dense index may be used so as to more quickly obtain the precise location of the requested archive.

In some embodiments, the volumes 906 may be grouped such that each given volume has one or more cohorts 916. In such embodiments, a volume set (e.g., all of the illustrated volumes 906) may be implemented such that incoming archives to be stored on the volumes are apportioned to one or more failure-decorrelated subsets of the volume set. The failure-decorrelated subsets may be some combination of the volumes 906 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 916). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 908 and/or original data archives 912), while others store derived data (e.g., derived data 910 and derived data 914). The data storage system 904 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 908 and derived data 910, while others are apportioned to volumes in a different pattern as shown by original data archives 912 and derived data 914. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 10:
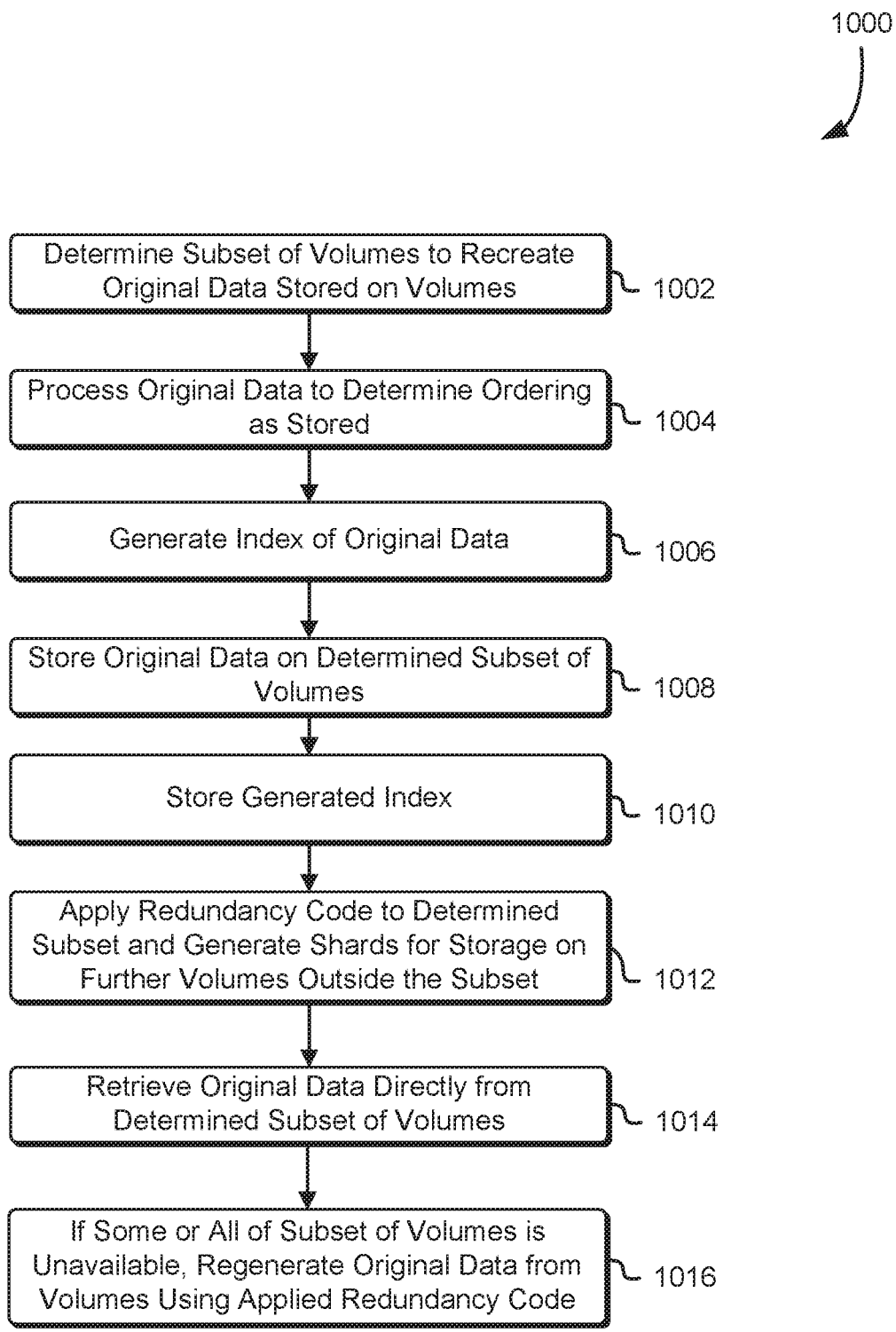
FIG. 10 illustrates an example process for applying redundancy encoding techniques to data stored in durable storage in accordance with at least one embodiment.

FIG. 10 illustrates an example process 1000 for applying redundancy encoding techniques to data stored in durable storage as described herein and in accordance with at least one embodiment. The example process 1000 illustrated in FIG. 10 illustrates the processing, indexing, storing, and retrieving of data stored on a data storage system. The data may be retrieved from preliminary storage as described herein. The example process 1000 illustrated in FIG. 10 may be used in conjunction with a grid encoding technique such that described in connection with FIG. 8, in conjunction with a bundle encoding technique such as that described in connection with FIG. 9, or with some other redundancy encoding technique. A data storage service may perform the example process 1000 illustrated in FIG. 10.

At step 1002, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 9, such information may be derived from predetermining the parameters of an erasure code with a specified ratio of shards that may be used to regenerate the original data from which they derive to the total number of shards generated from the application of the erasure code.

At step 1004, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 1006, one or more indices, such as sparse indices, are generated by, for example, the data storage system, for the original data. For example, there may be more than one index for a given volume, and such parallel indices may be of different types depending on the nature of the archives and/or original data being stored.

At step 1008, the original data is stored, for example, by the data storage system, on the subset of volumes determined in connection with step 1002, and in the order determined in step 1004. Additionally, at step 1010, the index generated in step 1006 is stored, for example, by the data storage system, on an appropriate entity. For example, the index may be stored as part of a shard on which the original data is stored, or, in some embodiments, may be stored on a separate resource from that which persists the volume.

At step 1012, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 1002. For example, the ratio of volumes (e.g., shards as previously described herein) storing the original data to the overall quantity of volumes (including those storing the derived data generated in this step 1012) may be prescribed by the recovery/encoding ratio of the redundancy code applied herein.

At step 1014, in normal operation, requested data may be retrieved, for example, by the data storage system, directly from the subset of volumes storing the original data, without necessitating retrieval and further processing (e.g., by the redundancy code) from the volumes storing the derived data generated in step 1012. However, at step 1016, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 11:
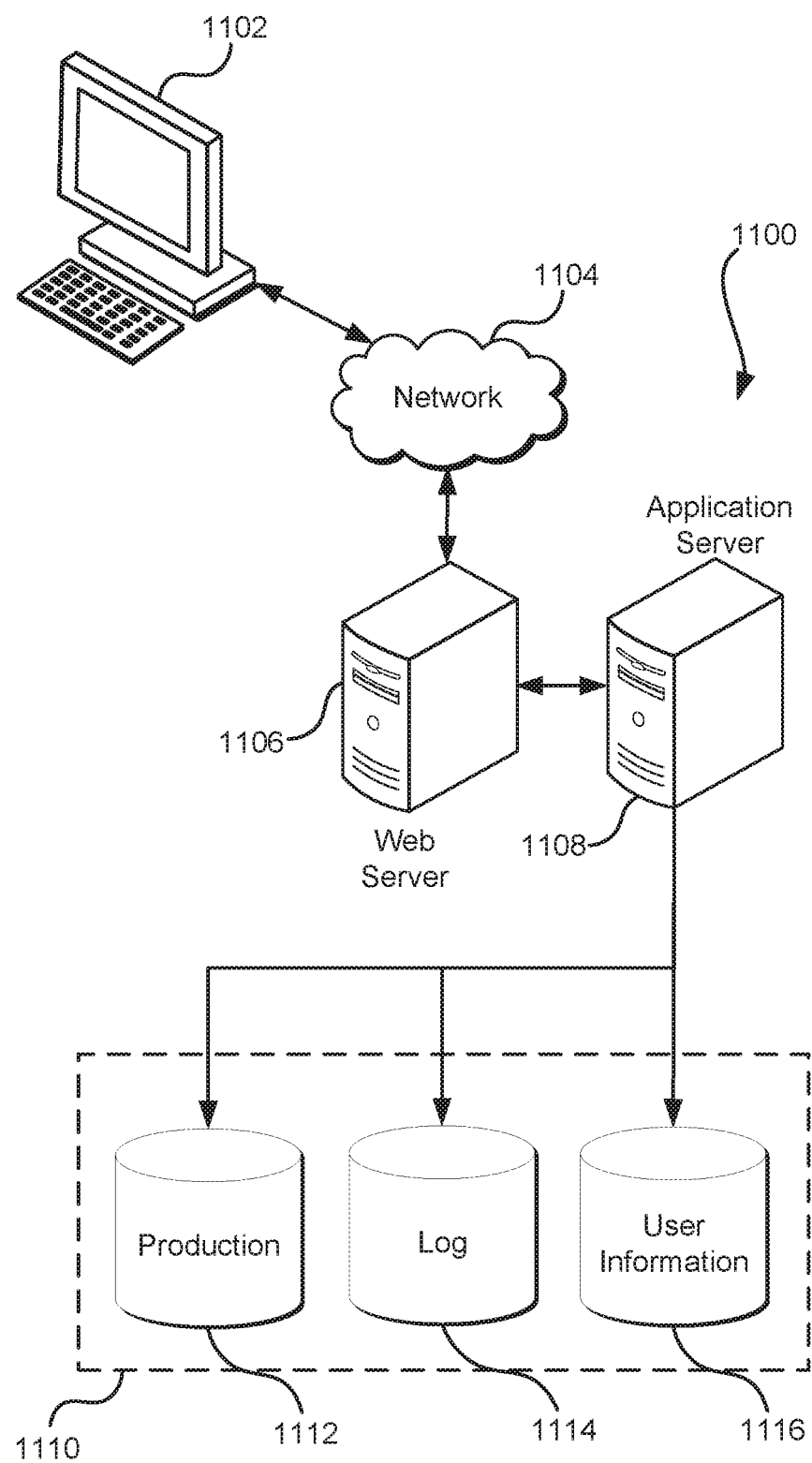
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment.

The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices, which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving structured data, the structured data including a schema that describes a plurality of columns in which at least a remaining portion of the structured data is organized, each column of the plurality of columns including a subset of the structured data, and individual columns of the plurality of columns correspond to respective data types of a plurality of data types of the structured data;
using at least the schema, transforming the structured data to generate a plurality of data components, each data component of the plurality of data components corresponding to a respective column of the plurality of columns;
generating metadata including information associating the plurality of data components with the structured data, the metadata further including information regarding a relationship between the plurality of data components and a relationship between the plurality of data components and the structured data, the information regarding the relationship between the plurality of data components indicating a correlation between the plurality of data components;
using at least the metadata and a redundancy code, processing each data component of the plurality of data components into a respective data shard so as to generate a plurality of data shards; and
generating at least one bundle of bundle-encoded shards from the plurality of data shards using at least the information regarding the relationship between the plurality of data components, the relationship between the plurality of data components and the structured data, and a history of one or more queries against the structured data, the at least one bundle including at least one derived shard that includes encoded data that, when combined with at least one data shard of the plurality of data shards in the bundle, is sufficient to reconstruct a different shard in the bundle.

2. The computer-implemented method of claim 1, further comprising:
receiving a request including a query against the structured data;
retrieving at least one bundle-encoded shard of the at least one bundle, the at least one bundle-encoded shard corresponding to a subset of the structured data; and
providing at least one outcome of the query relative to the retrieved at least one bundle-encoded shard.

3. The computer-implemented method of claim 2, wherein the at least one bundle-encoded shard corresponds to one or more respective data columns corresponding to at least one respective data component of the plurality of data components.

4. The computer-implemented method of claim 2, wherein the at least one bundle-encoded shard includes a derived shard.

5. A system, comprising:
one or more processors; and
memory including instructions that, when executed by the one or more processors, cause the one or more processors to at least:
receive data from a device, the data being associated with a schema that describes organization of a plurality of subsets of the data, the schema organizing individual subsets of the data of the plurality of subsets of data in separate columns based on a type of data associated with the plurality of subsets of the data;
using at least the schema, determine a plurality of data components, each data component of the plurality of data components corresponding to a respective subset of the plurality of subsets of the data according to the organization described by the schema;
associate, in a metadata engine, the plurality of data components with the structured data;
generate, by the metadata engine, metadata including information regarding a relationship between the plurality of data components determined at least based on the data received from the device; and
using at least the metadata and a second schema associated with a redundancy code, process the plurality of data components into a plurality of redundancy coded data shards for storage in a data storage device, the plurality of redundancy coded shards bundled together based on the information regarding a relationship between the plurality of data components and a history of one or more queries against the data.

6. The system of claim 5, wherein the one or more services further process the plurality of redundancy coded data shards into a bundle of bundle-encoded shards, the bundle including a derived shard.

7. The system of claim 5, wherein the schema is included as part of the data.

8. The system of claim 5, wherein the one or more services receive the schema separately from the data.

9. The system of claim 5, wherein the one or more services further determine, using a placement analyzer, one or more bundles in which to place the plurality of redundancy coded data shards based at least in part on historical metadata associated with queries for other data components stored on the data storage device.

10. The system of claim 5, wherein the one or more services receive the data via an application programming interface provided by the system.

11. The system of claim 5, wherein the data conforms to a structured data format.

12. The system of claim 5, wherein the organization includes a plurality of columns of the data.

13. A non-transitory computer-readable storage medium having stored thereon executable instructions that, as a result of being executed by one or more processors of a computer system, cause the computer system to at least:
process structured data, the structured data being associated with a schema that describes organization of a plurality of subsets of the data, the schema organizing individual subsets of the data of the plurality of subsets of data in separate columns based on different data types comprised in the structured data, to at least:
generate a plurality of redundancy coded shards, each redundancy coded shard of the plurality corresponding to a respective data component of a plurality of data components based at least in part on the organization described by the schema;

generate metadata associating the plurality of redundancy coded shards with each other and with the structured data; and store the plurality of redundancy coded shards and the metadata, the plurality of redundancy coded shards stored in a bundle at least based on one or more queries against the structured data that occurred prior to bundling the plurality of redundancy coded shards;

process a request including a query against the structured data, by at least:

determining, based at least in part on the metadata, a subset of the plurality of redundancy coded shards to retrieve;

processing the subset of the plurality of redundancy coded shards to retrieve a corresponding subset of the plurality of data components; and performing the query against the subset of the plurality of data components.

14. The non-transitory computer-readable storage medium of claim 13, wherein the instructions further comprise instructions that, as a result of being executed by the one or more processors, cause the computer system to process the structured data by compressing and encrypting the data prior to generating the plurality of redundancy coded shards.

15. The non-transitory computer-readable storage medium of claim 13, wherein the metadata is stored in a metadata engine.

16. The non-transitory computer-readable storage medium of claim 13, wherein at least some of the structured data originates from a network-connected sensor.

17. The non-transitory computer-readable storage medium of claim 13, wherein the redundancy coded shards are generated using an erasure code.

18. The non-transitory computer-readable storage medium of claim 13, wherein the instructions cause the computer system to further process the plurality of redundancy coded shards into bundles of bundle-encoded shards, each bundle of the bundles of bundle-encoded shards including at least one derived shard capable of being used to regenerate a different shard in the bundle.

19. The non-transitory computer-readable storage medium of claim 18, wherein each bundle of the bundles of bundle-encoded shards includes identity shards corresponding to original data of respective data components.

20. The non-transitory computer-readable storage medium of claim 18, wherein the bundles of bundle-encoded shards are organized into a grid of grid-encoded shards.

* * * * *